(12) United States Patent
Sridhar (10) Patent No.: US 8,606,108 B2
(45) Date of Patent: Dec. 10, 2013

(54) DISPERSION SLOPE COMPENSATION AND DISPERSION MAP MANAGEMENT SYSTEMS AND METHODS

(75) Inventor: Balakrishnan Sridhar, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 810 days.

(21) Appl. No.: 12/491,373

(22) Filed: Jun. 25, 2009

(65) Prior Publication Data

US 2010/0329695 A1 Dec. 30, 2010

(51) Int. Cl.
*H04J 14/02* (2006.01)
*H04B 10/00* (2013.01)
*H04B 10/12* (2011.01)

(52) U.S. Cl.
USPC ............. 398/81; 398/159; 398/147; 398/148

(58) Field of Classification Search
USPC .................................. 398/81, 159, 147, 148
See application file for complete search history.

(56) References Cited

U.S. PATENT DOCUMENTS

| | | | | |
|---|---|---|---|---|
| 5,956,440 | A * | 9/1999 | Mikami et al. ................... | 385/24 |
| 6,731,877 | B1 * | 5/2004 | Cao .................................. | 398/91 |
| 6,832,048 | B2 * | 12/2004 | Ishida et al. ...................... | 398/87 |
| 6,862,391 | B2 * | 3/2005 | Hirano et al. ................... | 385/123 |
| 7,020,398 | B2 * | 3/2006 | Takiguchi et al. ............ | 398/158 |
| 7,096,176 | B1 * | 8/2006 | Hess ................................. | 703/21 |
| 7,123,833 | B2 * | 10/2006 | Szczepanek et al. ........... | 398/33 |
| 7,826,748 | B2 * | 11/2010 | Yang et al. ....................... | 398/83 |
| 2002/0021862 | A1 * | 2/2002 | Zhou et al. ....................... | 385/24 |
| 2004/0161241 | A1 * | 8/2004 | Tomofuji et al. ............. | 398/147 |
| 2005/0089027 | A1 * | 4/2005 | Colton .......................... | 370/380 |
| 2006/0198575 | A1 * | 9/2006 | Doerr et al. ..................... | 385/18 |
| 2009/0097850 | A1 * | 4/2009 | Frisken .......................... | 398/81 |
| 2009/0226173 | A1 * | 9/2009 | Yano et al. ...................... | 398/85 |
| 2009/0238571 | A1 * | 9/2009 | Nakamura et al. ............. | 398/97 |
| 2010/0027995 | A1 * | 2/2010 | Farley ............................. | 398/49 |
| 2010/0142961 | A1 * | 6/2010 | Wisseman ...................... | 398/83 |
| 2011/0052188 | A1 * | 3/2011 | Feldman ........................ | 398/34 |

\* cited by examiner

*Primary Examiner* — Ken Vanderpuye
*Assistant Examiner* — Abbas H Alagheband
(74) *Attorney, Agent, or Firm* — Clements Bernard PLLC; Christopher L. Bernard; Lawrence A. Baratta, Jr.

(57) ABSTRACT

The present disclosure relates to dispersion slope compensation and dispersion map management systems and methods in an optical network utilizing a reconfigurable optical add-drop multiplexer (ROADM) with a plurality of different values of dispersion compensation modules (DCMs). The DCMs form a dispersion compensation ladder at certain intermediate nodes in the optical network to provide dispersion slope compensation and dispersion map management. The reconfigurable routing structure of the ROADM enables these intermediate nodes to route individual wavelengths to any one of the DCMs as required for the particular path of the wavelength. Advantageously, the present invention removes the requirement for banded compensation at receiver nodes and allows for dispersion map management at intermediate points along a fiber route as opposed to bulk compensation at the receiver.

19 Claims, 6 Drawing Sheets

DISPERSION SLOPE COMPENSATION AND DISPERSION MAP MANAGEMENT SYSTEMS AND METHODS

FIELD OF THE INVENTION

The present invention relates generally to optical networking. More particularly, the present invention relates to dispersion slope compensation and dispersion map management systems and methods in an optical network utilizing a reconfigurable optical add-drop multiplexer (ROADM) with a plurality of different values of dispersion compensation modules (DCMs) to form a dispersion compensation ladder at certain intermediate nodes in the optical network providing dynamic dispersion slope compensation and dispersion map management.

BACKGROUND OF THE INVENTION

Dispersion is a known limitation in optical networks that causes a broadening of input pulses traveling along the length of the fiber. One type of dispersion relevant to the present invention is chromatic dispersion (also referred to as "material dispersion" or "intramodal dispersion"), caused by a differential delay of various wavelengths of light in a waveguide material. Dispersion has a limiting effect on the ability to transmit high data rates. When modulated onto an optical carrier, an optical spectrum is broadened in linear proportion to the bit rate. The interaction of the broadened optical spectrum with wavelength-dependent group velocity (i.e., dispersion) in the fiber introduces signal distortions. The amount of tolerable distortion is inversely proportional to the square of the bit rate. Thus, the combination of increasing spectral broadening and decreasing distortion tolerance makes the overall propagation penalty proportional to the square of bit rate. This results, for example, in a 10 Gbps signal being 16 times less tolerant to dispersion than 2.5 Gbps signal, while having only four times the bit rate. Dispersion accumulates linearly with propagation distance in the fiber and typical propagation distances in standard single-mode fiber (e.g., SMF-28 or equivalent) are about 1000 km at 2.5 Gbps, 60 km at 10 Gbps, and only about 4 km at 40 Gbps. Clearly, some form of dispersion compensation is required to obtain meaningful propagation distances at bit rates of 10 Gbps and above.

Dispersion compensating fiber (DCF) (also referred to as a Dispersion Compensation Module or DCM) has found widespread practical acceptance and deployment due to numerous advantages. Such advantages include relatively low loss and cost and the ability to simultaneously compensate channels across multiple wavelengths without requiring spatial separation. Further, DCF has the ability to compensate for the unavoidable variation in the dispersion as a function of wavelength (second-order dispersion or dispersion slope) that exists in many current transport fibers. To compensate for positive dispersion in a transmission fiber, conventional systems use lengths of DCF that have a negative dispersion coefficient. The length of DCF is selected so that the negative dispersion produced by the DCF counteracts the positive dispersion in the transmission fiber. Similarly, positive dispersion DCF can be used to counteract the negative dispersion of some fiber types. While DCF provides adequate levels of dispersion compensation, it is difficult to produce DCF that also simultaneously compensates the dispersion slope. As transmission lengths between regeneration points increase and data rates increase, the need to compensate dispersion slope is paramount. Uncompensated dispersion slope results in system penalty and can significantly shorten transmission distances and/or channel counts. Ideally, upon reception each channel should have the same amount of net dispersion so that the net dispersion slope is zero.

Figure 1:
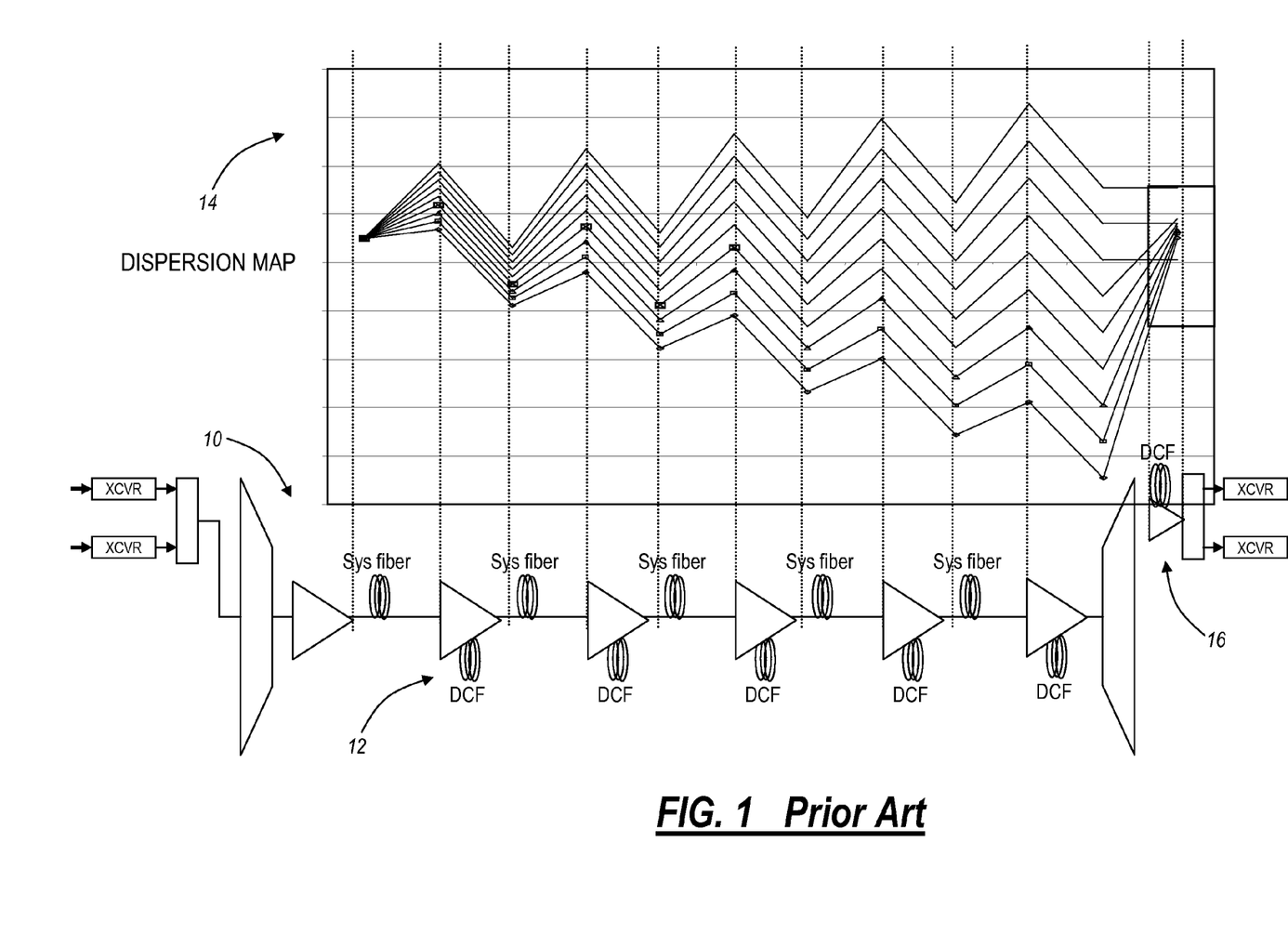
FIG. 1 is a diagram and graph of an existing dispersion management technique is illustrated on a fiber link.

Referring to FIG. 1, an existing dispersion management technique is illustrated on a fiber link 10. Existing Dispersion management techniques rely on a high-slope dispersion compensating module (i.e., Type III DCMs) to compensate for high dispersion slope transmission fiber such as Large Effective Area Fiber (LEAF, available from Corning, Inc. of Corning, N.Y.), Truewave fibers (TW, available from OFS of Norcross, Ga.), and the like. DCFs 12 are distributed along the fiber link 10. The DCFs 12 do not provide perfect compensation across the entire C-Band, i.e. approximately 1530 nm to 1565 nm, as illustrated in a dispersion map 14 that is shown corresponding to various points on the fiber link 10. Additional compensation is achieved by using band compensating DCMs 16 to trim the dispersion at the receiver. For certain fiber types such as Dispersion Shifted Fiber (DSF) specified in ITU-T G.653 and LS fibers (available from Corning, Inc.), where the zero dispersion is within the transmission window, the dispersion compensation almost always is based on band-level compensation. Band-level compensation is typically a correction that is applied only before the receiver.

Conventional dispersion management techniques have several shortcomings. First, the residual dispersion error from a slope mismatch between the DCM and transmission fiber can only be compensated at the receiver (Rx) node. Also, the compensation at any node is static, and is usually computed by a design tool, based on where the band is added in the network. Any change in the traffic pattern requires a new band DCM. Thirdly, because the dispersion compensation is banded, this forces the path dispersion for all the channels in the band to within a narrow window. This has the effect of banding the channels, which may not be desirable for Reconfigurable Optical Add-Drop Multiplexed (ROADM)-based mesh networks. Finally, the most important limitation of band compensation is that it forces a banded de-multiplexor architecture, which is not the most cost efficient solution.

Figure 2:
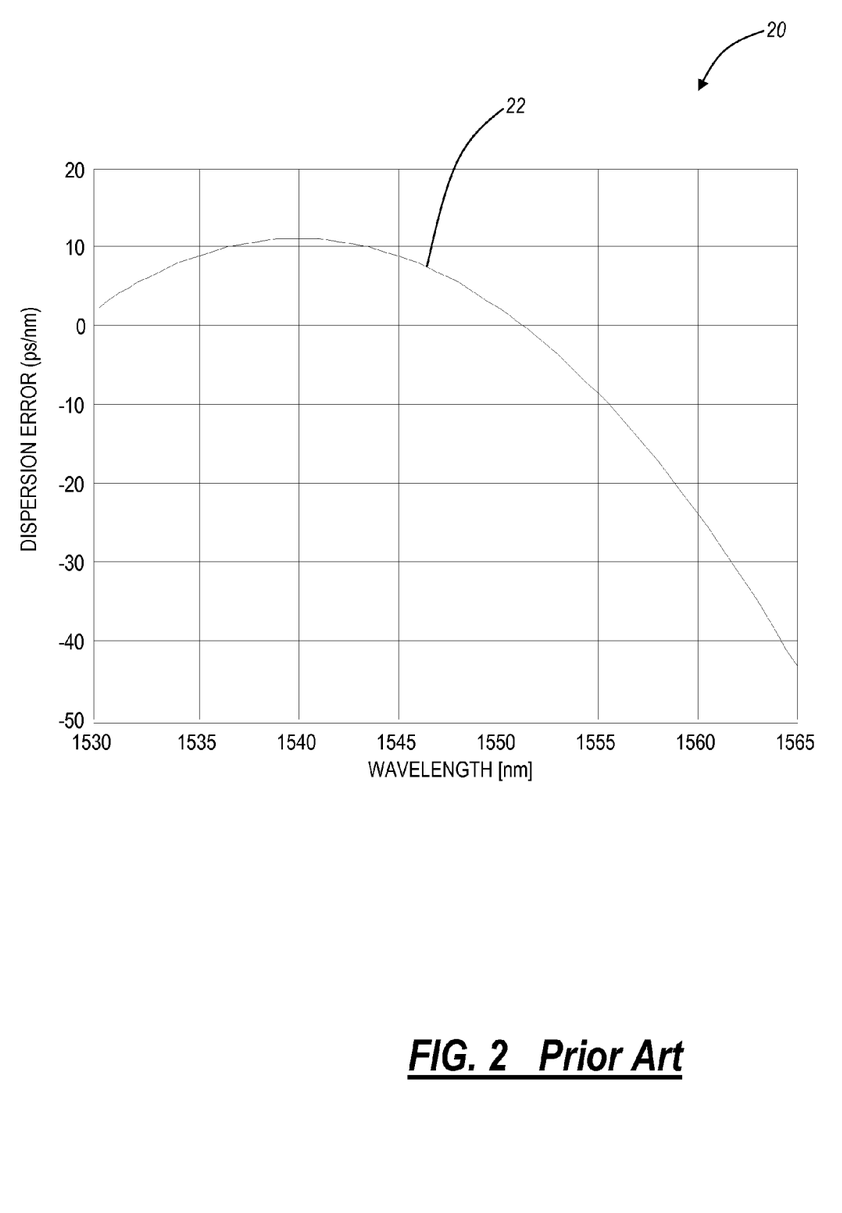
FIG. 2 is a graph of a typical dispersion error due to slope mismatch between TW-classic (TWC) fiber plant and a type III DCM.

Referring to FIG. 2, a graph 20 illustrates a typical dispersion error due to slope mismatch between TW-classic (TWC) fiber plant and a type III DCM. The graph 20 is a plot of dispersion error 22 in time (ps) versus wavelength (nm). If the dispersion error 22 is minimized at the center of the band (i.e., approximately 1550 nm), the error is typically ±30 ps/nm for every 100 km of transmission fiber. The error contribution from DSF fiber plant with the zero dispersion at the center of the transmission band is much higher at approximately ±120 ps/nm for every 100 km of transmission fiber Thus there exists a need to provide dispersion slope and dispersion map management without the aforementioned limitations.

BRIEF SUMMARY OF THE INVENTION

In various exemplary embodiments, the present invention relates to dispersion slope compensation and dispersion map management systems and methods in an optical network utilizing a reconfigurable optical add-drop multiplexer (ROADM) with a plurality of different values of dispersion compensation modules (DCMs). The DCMs form a dispersion compensation ladder at certain intermediate nodes in the optical network to provide dispersion slope compensation and dispersion map management. The reconfigurable routing structure of the ROADM enables these intermediate nodes to route individual wavelengths to any one of the DCMs as required for the particular path of the wavelength. Advantageously, the present invention removes the requirement for banded compensation at receiver nodes and allows for dispersion map management at intermediate points along a fiber route as opposed to bulk compensation at the receiver.

In an exemplary embodiment of the present invention, a dispersion compensation node includes a reconfigurable input device; a reconfigurable output device; and a plurality of dispersion compensation elements each connected to the reconfigurable input device and the reconfigurable output device, wherein the plurality of dispersion compensation elements include different dispersion compensation values. The reconfigurable input device and the reconfigurable output device are configured to route a wavelength to one of the plurality of dispersion compensation elements responsive to compensation required for the wavelength, and the reconfigurable input device and the reconfigurable output device are further configured to dynamically adjust the compensation required using feedback from one of a tunable dispersion compensator and either a bit-error rate (BER) or Q measurement at a receiver. Optionally, the reconfigurable input device includes a de-multiplexer configured to receive an input including one or more wavelengths and to split copies of the one or more wavelengths to the plurality of dispersion compensation elements; and the reconfigurable output device includes a wavelength selective switch configured to receive inputs of the one or more wavelengths from each of the plurality of dispersion compensation elements and to selectively couple the one or more wavelengths to an output. Alternatively, the reconfigurable input device includes a wavelength selective switch configured an input including one or more wavelengths and to selectively couple each of the one or more wavelengths to the plurality of dispersion compensation elements based on an amount of compensation needed for each of the one or more wavelengths; and a multiplexer configured to receive inputs from each of the plurality of dispersion compensation elements and to couple the inputs to an output. The plurality of dispersion compensation elements includes a dispersion compensation ladder such that each of the different dispersion compensation values for the plurality of dispersion compensation elements are in one of uniform and non-uniform steps. A step size for the uniform and non-uniform steps is responsive to a number of ports on the reconfigurable input device and the reconfigurable output device. The dispersion compensation node further includes at least one wavelength that is dropped and added through the reconfigurable input device and the reconfigurable output device. The dispersion compensation node further includes a computer configured to execute a planning tool to determine the different dispersion compensation values responsive to fiber types and wavelength routing. The dispersion compensation node further includes a plurality of dense wave division multiplexed wavelengths traversing the reconfigurable input device, the plurality of dispersion compensation elements, and the reconfigurable output device; wherein at least one of the plurality of dense wave division multiplexed wavelengths includes a different path from at least one other of the plurality of dense wave division multiplexed wavelengths such that the at least one and the at least one other traverse different elements of the plurality of dispersion compensation elements.

In another exemplary embodiment of the present invention, an optical network includes a plurality of nodes, wherein at least one of the plurality of nodes includes a reconfigurable optical add-drop multiplexer configured with a dispersion compensation ladder including a plurality of dispersion compensation elements of differing values disposed between inputs and outputs of the reconfigurable optical add-drop multiplexer; and an algorithm configured to route wavelengths traversing the reconfigurable optical add-drop multiplexer configured with the dispersion compensation ladder to one of the plurality of dispersion compensation elements based on an amount of dispersion compensation required for each of the wavelengths. Optionally, the reconfigurable optical add-drop multiplexer includes a de-multiplexer configured to receive an input including one or more wavelengths and to split copies of the one or more wavelengths to the plurality of dispersion compensation elements; and a wavelength selective switch configured to receive inputs of the one or more wavelengths from each of the plurality of dispersion compensation elements and to selectively couple the one or more wavelengths to an output. Alternatively, the reconfigurable optical add-drop multiplexer includes a wavelength selective switch configured an input including one or more wavelengths and to selectively couple each of the one or more wavelengths to the plurality of dispersion compensation elements based on an amount of compensation needed for each of the one or more wavelengths; and a multiplexer configured to receive inputs from each of the plurality of dispersion compensation elements and to couple the inputs to an output. The dispersion compensation ladder is configured such that each of the plurality of dispersion compensation elements includes different dispersion compensation values in one of uniform and non-uniform steps. A step size for the uniform and non-uniform steps is responsive to a number of ports on reconfigurable optical add-drop multiplexer. The optical network further includes at least one wavelength that is dropped and added at the reconfigurable optical add-drop multiplexer. The optical network further includes a computer configured to execute a planning tool to determine different dispersion compensation values for the dispersion compensation ladder responsive to fiber types and wavelength routing, and the algorithm is configured to dynamically adjust the amount of dispersion compensation required using feedback from one of a tunable dispersion compensator and either a bit-error rate (BER) or Q measurement at a receiver. The optical network of further includes a plurality of dense wave division multiplexed wavelengths traversing the reconfigurable optical add-drop multiplexer; wherein at least one of the plurality of dense wave division multiplexed wavelengths includes a different path from at least one other of the plurality of dense wave division multiplexed wavelengths such that the at least one and the at least one other traverse different elements of the plurality of dispersion compensation elements.

In yet another exemplary embodiment of the present invention, a method of dispersion compensation in an optical network includes configuring the optical network with at least one reconfigurable optical add-drop multiplexer node including a dispersion compensation ladder including a plurality of dispersion compensation elements of differing values disposed between inputs and outputs of the reconfigurable optical add-drop multiplexer; adding a wavelength that traverses the at least one reconfigurable optical add-drop multiplexer node; determining dispersion compensation required for the wavelength responsive to a path of the wavelength in the optical network; and configuring the at least one reconfigurable optical add-drop multiplexer node to route the wavelength to one of the plurality of dispersion compensation elements responsive to the dispersion compensation required. The method further includes adding a second wavelength that traverses the at least one reconfigurable optical add-drop multiplexer node, wherein the second wavelength includes a different path from the path of the wavelength; determining dispersion compensation required for the second wavelength responsive to the different path of the second wavelength in the optical network; and configuring the at least one reconfigurable optical add-drop multiplexer node to route the second wavelength to one of the plurality of dispersion compensation elements responsive to the dispersion compensation required. The method further includes reconfiguring a second wavelength in the optical network such that the second wavelength traverses the at least one reconfigurable optical add-drop multiplexer node; determining dispersion compensation required for the second wavelength responsive to a path of the second wavelength in the optical network; and configuring the at least one reconfigurable optical add-drop multiplexer node to route the second wavelength to one of the plurality of dispersion compensation elements responsive to the dispersion compensation required.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides dispersion slope compensation and dispersion map management systems and methods in an optical network utilizing a reconfigurable optical add-drop multiplexer (ROADM) with a plurality of different values of dispersion compensation modules (DCMs). The DCMs form a dispersion compensation ladder at certain intermediate nodes in the optical network to provide dispersion slope compensation and dispersion map management. The reconfigurable routing structure of the ROADM enables these intermediate nodes to route individual wavelengths to any one of the DCMs as required for the particular path of the wavelength. Advantageously, the present invention removes the requirement for banded compensation at receiver nodes and allows for dispersion map management at intermediate points along a fiber route as opposed to bulk compensation at the receiver, i.e. without accumulating dispersion for compensation at the receiver. This can provide slope compensation for high slope fibers (such as TW, LEAF, etc.) and for DSF and LS fiber. Further, the present invention eliminates the need for band compensation at the Rx node, thus freeing up the need for banded de-multiplexer architecture.

Figure 3A:
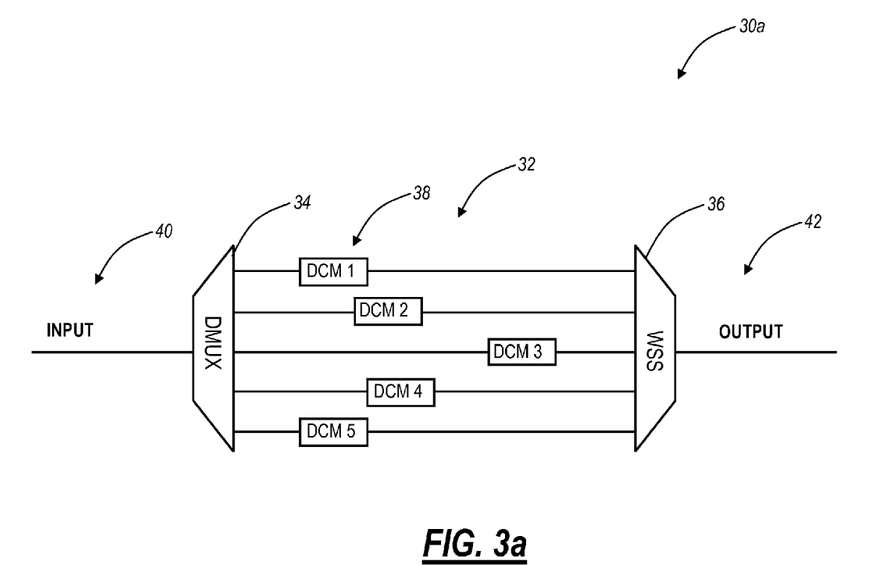
FIGS. 3a and 3b are diagrams of a dispersion slope correction node with a dispersion compensation ladder according to an exemplary embodiment of the present invention.
Figure 3B:
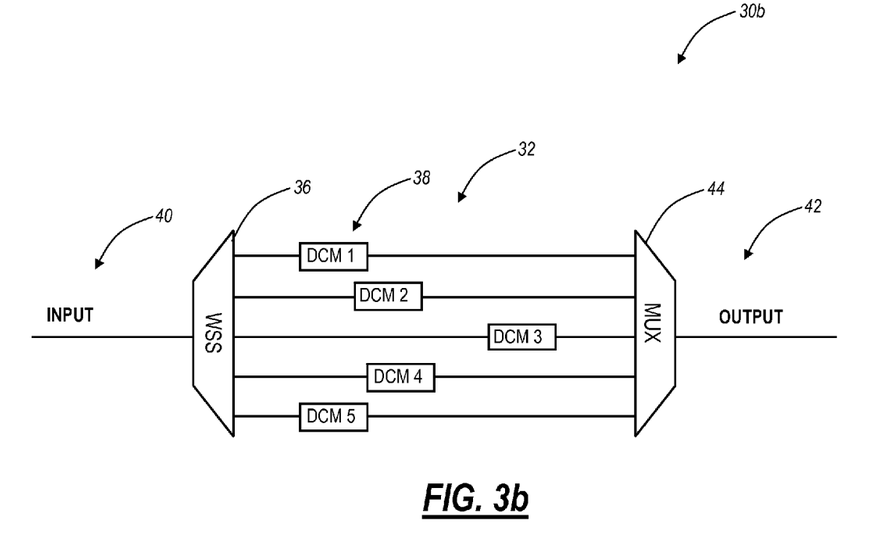

Referring to FIGS. 3a and 3b, a dispersion slope correction node 30a, 30b is illustrated with a dispersion compensation ladder 32 according to an exemplary embodiment of the present invention. The dispersion slope correction node 30 is akin to a ROADM node in an optical network with a de-multiplexer 34 and a wavelength selective switch (WSS) 36, for example. Optical networks typically include ROADM nodes at locations where one or more wavelengths are added and/or dropped. The present invention proposes utilizing the ROADM node not only to add/drop wavelengths, but rather to implement the dispersion compensation ladder 32 to compensate dispersion and dispersion slope at an intermediate point along a fiber link (additionally, the ROADM node can still add/drop channels on unused ports). Advantageously, the present invention removes the requirement for banding wavelengths and for banded compensation at receiver nodes. Specifically, the dispersion compensation ladder 32 contemplates use with any ROADM technology and the de-multiplexer 34 and the WSS 36 are shown for illustration purposes of an exemplary embodiment.

A ROADM node is a form of optical add-drop multiplexer (OADM) that is configured to remotely switch traffic from a wavelength division multiplexed (WDM) system at the wavelength layer. Typically, this allows individual or multiple wavelengths carrying data channels to be added and/or dropped from a transport fiber without the need to convert the signals on all of the WDM channels to electronic signals and back again to optical signals. ROADMs enable the bandwidth assignments to be made dynamically as and when required without affecting traffic already passing the ROADM. ROADMs also allow for remote configuration and reconfiguration without physically requiring an operator to switch fiber cabling. ROADMs also support power balancing and the like of the wavelengths. The switching or reconfiguration functions of a ROADM can be achieved using a variety of switching technologies including micro-electromechanical systems (MEMS), liquid crystal, thermo optic and beam-steering switches in planar waveguide circuits, tunable optical filter technology, and the like. As described herein, the WSS 36 is an example of MEMS technology.

The dispersion compensation ladder 32 includes a plurality of DCMs 38 interconnected to an input 40 and an output 42 at the dispersion slope correction node 30. In the example of FIGS. 3a and 3b, the plurality of DCMs 38 includes five DCM modules, DCM1, DCM2, DCM, DCM4 and DCM5. Each of the plurality of DCMs 38 includes different DCM modules, i.e. different compensation values. Specifically, DCMs 38 are specified in terms of type and length of compensation. For example, an NDSF type DCM could typically come in values specified for 10, 20, 30, 40, 50, 60, 70, 80, 90, 100, 110, and 120 km, i.e. 10 km steps (e.g., a NDSF type DCM is also referred to as a Type 0 DCM). A LEAF type DCM could typically come in values specified for 20, 40, 60, 80, 100, 120, and 140 km, i.e. 20 km steps. (e.g., a LEAF type DCM is also referred to as a Type III DCM). The specified distance (e.g., 20 km, etc.) refers to the amount of dispersion compensated by that module (i.e., a dispersion value). For example, a 20 km LEAF type DCM compensates the equivalent of 20 km of LEAF transmission fiber. There are also DCMs for TWrs, LS, and the like with similar steps. DCMs 38 can provide compensation both for the amount of dispersion (based on the length specified) and dispersion slope (based on the type of DCM). Also, the DCMs 38 can include tunable dispersion compensators (TDC) or any other type of dispersion compensation device or elements. The present invention is described herein with DCMs or DCF, but those of ordinary skill in the art will recognize the present invention contemplates use of any dispersion and dispersion slope compensating element. The dispersion compensation ladder 32 includes dispersion values of the plurality of DCMs 38 can increase in uniform or non-uniform steps based on a fiber tool and the dispersion error. Specifically, the fiber tool can include a network design and planning tool or the like used to perform network planning to design an optical network. The design of the optical network includes generally determining add/drop locations (i.e., terminals, ROADMs, etc.) and amplifier locations. Further, the design includes dispersion compensation requirements such as amount of compensation and type of compensation based on fiber types in the optical network. The present invention contemplates the fiber tool or the like can provide information related to what DCMs 38 are required (type, step size, etc.). The minimum attainable step size is based on the number of ports available on the WSS (or other ROADM device) and the range for trimming the dispersion. The dispersion compensation ladder 32 includes multiple different types of DCMs 38 based on the fiber types present in the optical network and based on a uniform or non-uniform step for different dispersion compensation values.

FIG. 3*a* is a ROADM node with the de-multiplexer 34 at the input 40 and the WSS 36 at the output 42. FIG. 3*b* is a ROADM node with the WSS 36 at the input 40 and the multiplexer 44 at the output 42. Note, the present invention contemplates operation with either configuration and with any other ROADM implementation. The present invention leverages the dynamic pass-through capabilities of ROADMs to provide the plurality of DCMs 38 with different specifications at the node interior, and relying on ROADM routing techniques to provide each of a plurality of wavelengths to specific DCMs 38. Specifically, the dynamic wavelength routing capabilities of ROADMs allows any wavelength passing through the correction node 30 to go through any of the plurality of DCMs 38. Further, this can be remotely configured such as in situations where a wavelength changes its overall path in the optical network (e.g., through a protection switch, reconfiguration, or the like).

In FIG. 3*a*, the input 40 includes a plurality of wavelengths that are split by the de-multiplexer 34. In this example, the de-multiplexer 34 is performing a 1×5 split to split the input 40 into five outputs each carrying all the plurality of wavelengths through the respective DCMs 38 in the mid stage of the correction node 30*a*. The WSS 36 receives outputs from each of the respective DCMs 38 and selectively couples individual wavelengths from each of the DCMs 38 as required to the output 42. In FIG. 3*b*, the input 40 includes the plurality of wavelengths that are selectively coupled by the WSS 36 into specific DCMs 38 as required for that particular wavelength. Each of the DCMs 38 is connected to the multiplexer 44 which couples all of the outputs of the DCMs 38 onto the output 42.

The WSS 36 can include a MEMs-based wavelength-selective switch (WSS). In FIG. 3*a*, the WSS 36 is configured to direct each wavelength from a plurality of input ports (e.g., "N") to an output port. In FIG. 3*b*, the WSS is configured to direct each wavelength from a common input port to any one of multiple (e.g., "N") output ports. To indicate device fan out, these devices are often classified as "1×N" devices, with a "1×9" WSS meaning a ten port device, with one common input and nine output ports (or nine input ports and one common output port). Other port counts could include 4 ports, 15 ports, 23 ports, etc. The present invention can be used with any port count with the higher port count enabling smaller steps on the dispersion compensation ladder 32. Also, the WSS 36 provides variable optical attenuation (VOA) and suppression of amplified stimulated emission (ASE).

The dispersion slope correction node 30*a*, 30*b* can include additional optical equipment not shown in FIGS. 3*a* and 3*b*, such as optical amplifiers (OAs), optical performance monitors (OPMs), dynamic gain equalizers (DGEs), and the like.

Further, the dispersion slope correction node 30*a*, 30*b* can also be configured for local add/drop as a typical ROADM. For example, the dispersion slope correction node 30*a*, 30*b* utilizes five DCMs 38 in the dispersion compensation ladder 32 and assuming the WSS 36 is a ten port device, there are four additional unused ports associated with the WSS 36. This can enable local add/drop up to the amount of unused ports on the WSS 36.

Figure 4:
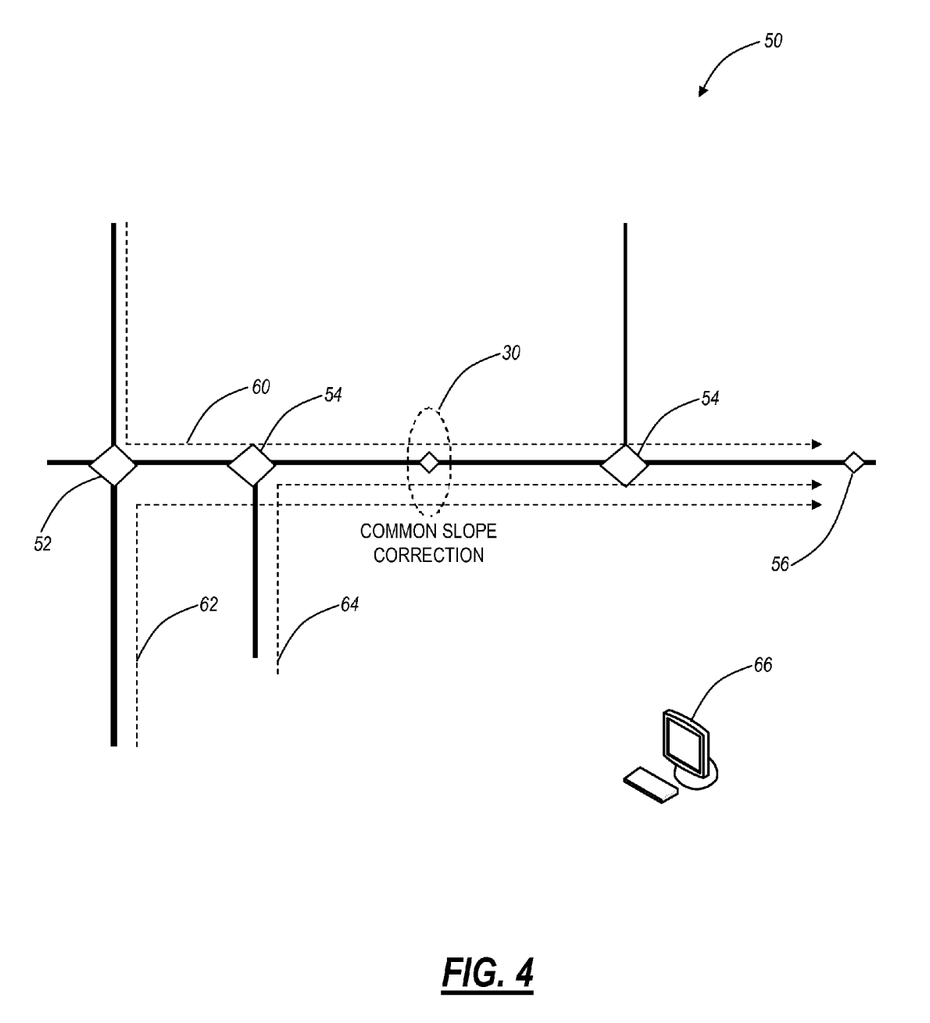
FIG. 4 is a network diagram of a portion of an optical network with a dispersion slope correction node according to an exemplary embodiment of the present invention.

Referring to FIG. 4, a portion of an optical network 50 is illustrated with a dispersion slope correction node 30 according to an exemplary embodiment of the present invention. The optical network 50 can include a metro, regional, long-haul, ultra-long-haul, or the like network. In this example, the optical network 50 is configured in a mesh topology and those of ordinary skill in the art will recognize that the present invention can be utilized in any network topology (e.g., linear, ring, mesh, etc.). For illustration purposes, the portion of the optical network 50 is illustrated with a four-degree ROADM 52, two three-degree ROADMs 54, and a two-degree ROADM 56. The optical network 50 can include terminals, regenerators, OADM, ROADM, amplifier nodes, and the like which are not illustrated in FIG. 4. As described herein, the optical network 50 includes the dispersion slope correction node 30 at an intermediate site in the network 50 to provide the dispersion compensation ladder 32 functionality. Specifically, the dispersion slope correction node 30 is a two-degree ROADM with a plurality of DCMs 36 of varying dispersion values.

The optical network 50 includes optical channels 60, 62, 64 that are different wavelengths traversing the optical network 50 with different ingress and egress points. However, each of the optical channels 60, 62, 64 traverses the dispersion slope correction node 30. The present invention can provide better dispersion map optimization over conventional techniques using the dispersion slope correction node 30. The non-linear performance of the optical channels 60, 62, 64 is a function both the linear residual dispersion and the residual dispersion at the different span inputs along the path in the optical network 50. In conventional dispersion map management techniques, the slope compensation was achieved only at the receive node (egress). This limited the dispersion map performance because any dispersion error builds up to the end of the map. In the present invention, the dispersion error correction can be done in the middle of the map at the dispersion slope correction node 30, thus minimizing the error by 50%. Also, the optical network can use the dispersion slope correction node 30 at multiple locations to trim the DCM. This can increase the maximum transmission distance (across the maximum bandwidth) on all NZ-DSF fiber types.

The dispersion map is currently designed for each link (e.g., a link connects two nodes such as the ROADM 52 and the ROADM 54). If the nodes are closely spaced, the dispersion map becomes flat. This limits the performance for 40G and 100G channels. The present invention allows the dispersion map to be decoupled for different groups of channels (i.e., there is not a requirement to reduce the residual dispersion to zero for every channel at a node). For example, the dispersion slope correction node 30 can provide differing amounts of dispersion and dispersion slope compensation for the optical channels 60, 62, 64 based on their specific requirements by sending each of the optical channels 60, 62, 64 to different DCMs 38 in the dispersion compensation ladder 32. The most important benefits are that the dispersion trimming can be dynamic. In a ROADM network such as the optical network 50, the optical channel path and wavelength can be reconfigured over the life of the optical network 50 due to changing demand requirements. The dispersion can be trimmed based on feedback from a TDC (tunable dispersion compensator) or Q to optimize the residual dispersion and the dispersion map for a channel and channel path. Specifically, the dispersion value applied to each of the optical channels 60, 62, 64 can be dynamically adjusted using feedback from a tunable dispersion compensator or through a bit-error rate (BER) or Q measurement at a receiver by changing the particular DCMs 38 in the dispersion compensation ladder 32 through the ROADM.

In addition to providing the dispersion compensation ladder 32, the dispersion slope correction node 30 can be a standard two-degree ROADM that has local add/drop channels. Here, the dispersion compensation ladder 32 can be implemented on any spare or unused ports. Additionally, the dispersion compensation ladder 32 can also be implemented at other nodes in the optical network 50, such as the ROADMs 52, 54, 56. These ROADMs 52, 54, 56 can implement the dispersion compensation ladder 32 on their respective spare or unused ports. Advantageously, the present invention eliminates multiple dispersion modules from the receiver nodes (i.e., using the existing router or banded DCM approach), by combining the dispersion correction for multiple optical paths by choosing a common node. This can significantly reduce the number of DCM 38 modules deployed throughout the optical network 50 and share cost among many channels. For example, conventional approaches can require a single DCM 38 at a receiver where there is a single channel dropping. The dispersion slope correction node 30 with the dispersion compensation ladder 32 shares the DCM 38 with many other channels that traverse the dispersion slope correction node 30 and can eliminate the need for the single DCM 38 at the receiver. Also, the present invention allows dispersion correction and channel equalization to be combined on long fiber links. For example, the dispersion slope correction node 30 can also include dynamic gain equalization components as well for channel equalization or this can be done through the WSS 36. Even though the optical channels 60, 62, 64 traverse different paths in the optical network 50, they share a single correction point (i.e., the dispersion slope correction node 30) common to all these different paths that is sufficient to correct all the dispersion error for all the different optical paths.

The optical network 50 further includes a computer 66 configured to run any of a network management system (NMS), element management system (EMS), network planning tool, fiber design tool, or the like. The computer 66 can be a digital computer that, in terms of hardware architecture, generally includes a processor, input/output (I/O) interfaces, network interfaces, a data store, and memory. These components are communicatively coupled via a local interface or bus. The processor is a hardware device for executing software instructions. The processor can be any custom made or commercially available processor, a central processing unit (CPU), an auxiliary processor among several processors associated with the computer 66, a semiconductor-based microprocessor (in the form of a microchip or chip set), or generally any device for executing software instructions. When the computer 66 is in operation, the processor is configured to execute software stored within the memory, to communicate data to and from the memory, and to generally control operations of the computer 66 pursuant to the software instructions. In the present invention, the computer 66 is utilized for determining dispersion compensation requirements of the entire optical network 50 based on planning information, for determining a configuration of the dispersion slope correction node 30, and for determining which of the DCMs 38 a particular wavelength should utilize at the dispersion slope correction node 30. Additionally, the computer 66 can be coupled to the optical network 50 such as through a network interface, and the computer 66 can direct the dispersion slope correction node 30 to automatically route wavelengths to specific DCMs 38.

Figure 5:
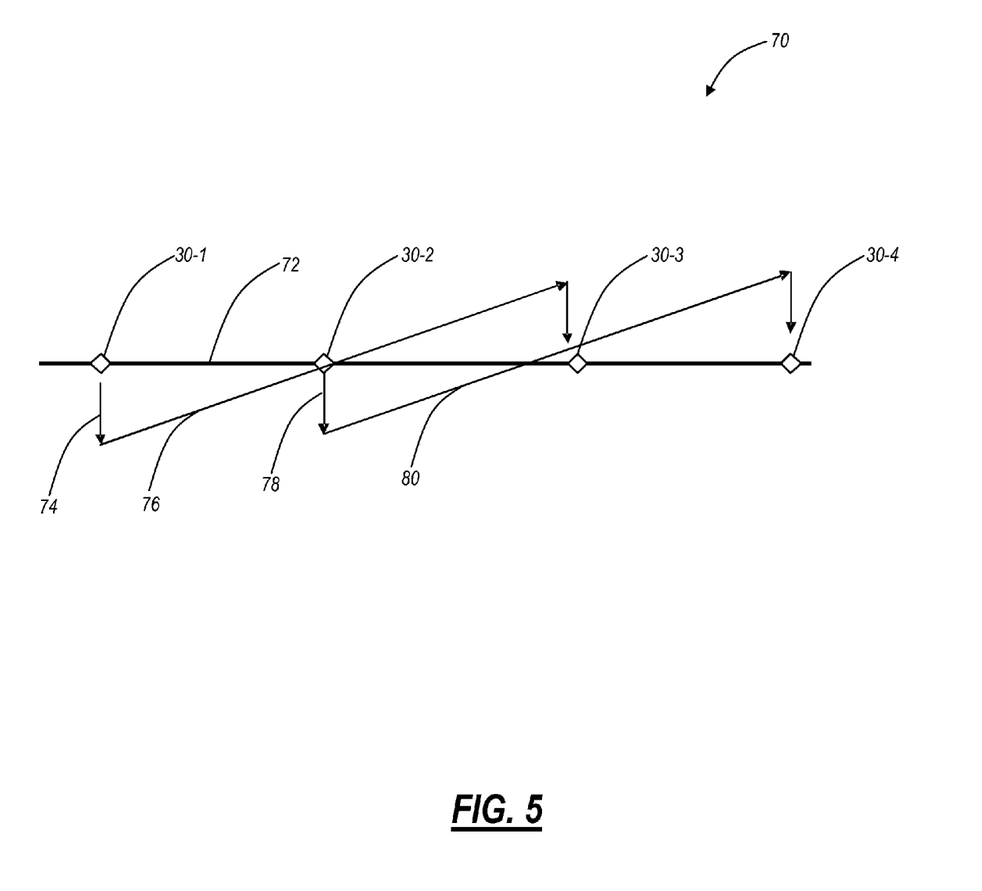
FIG. 5 is a dispersion map of dispersion map management using the dispersion compensation ladder in an optical network according to an exemplary embodiment of the present invention.

Referring to FIG. 5, a dispersion map 70 illustrates dispersion map management using the dispersion compensation ladder 32 in an optical network according to an exemplary embodiment of the present invention. The dispersion map 70 is illustrated on a long fiber optic link 72 with a total of four dispersion slope correction nodes 30-1, 30-2, 30-3, 30-4. For example, the dispersion map 70 starts at the correction node 30-1 by providing an amount of dispersion compensation 74 to multiple optical channels at node 30-1. These optical channels then traverse the fiber optic link 72 accumulating dispersion (denoted by line 76). At the node 30-2, some of the optical channels are dropped (without the need for Rx side dispersion compensation), some of the optical channels are compensated by an amount of dispersion compensation 76, and some of the optical channels continue on the fiber optic link 72 without additional compensation (continuing on the line 76). The newly compensated channels traverse the fiber optic link 72 accumulating dispersion (denoted by line 80). Thus, this intermediate dispersion compensation ladder 32 provides flexibility to provide dynamic dispersion compensation along the fiber optic link 72 without accumulating dispersion for compensation at the receiver. This can provide slope compensation for high slope fibers (such as TW, LEAF, etc.) and for DSF and LS fiber. Further, the present invention eliminates the need for band compensation at the Rx node, thus freeing up the need for banded de-multiplexer architecture.

Figure 6:
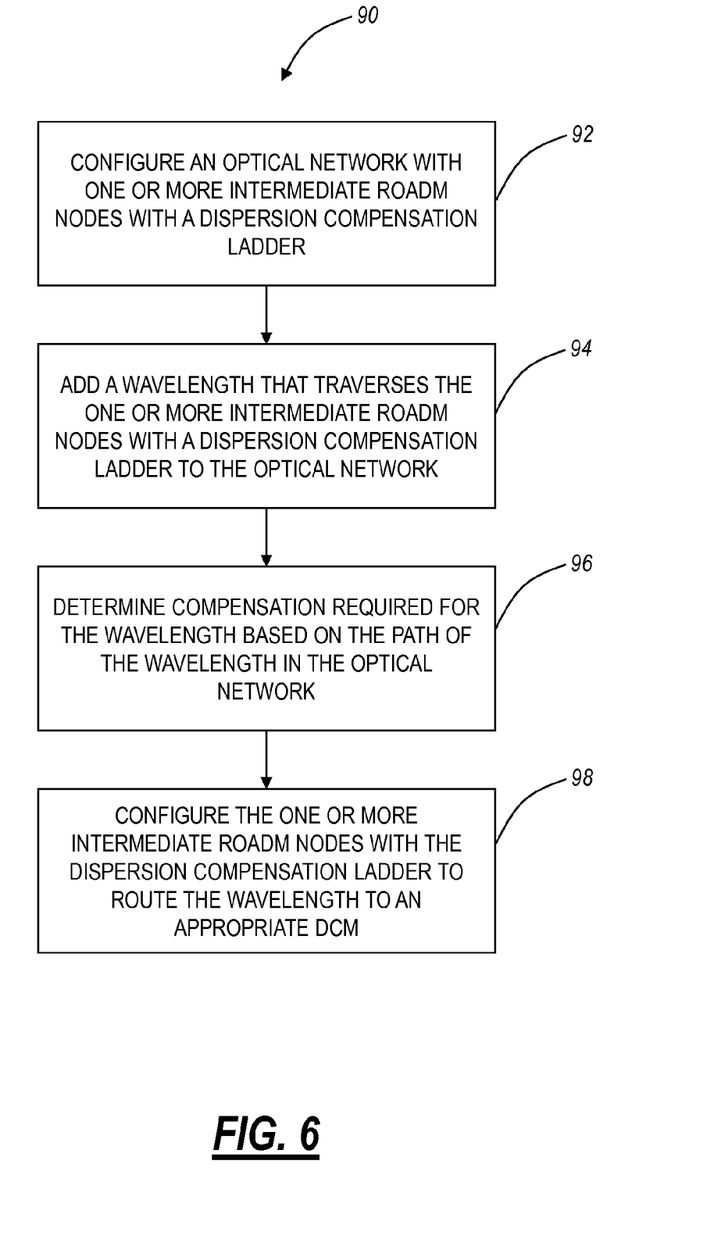
FIG. 6 is a flowchart of a dispersion compensation laddering technique in an optical network according to an exemplary embodiment of the present invention.

Referring to FIG. 6, a flowchart is illustrated of a dispersion compensation laddering technique 90 in an optical network according to an exemplary embodiment of the present invention. First, an optical network is configured with one or more intermediate ROADM nodes with a dispersion compensation ladder (step 92). The optical network can include any type of network (e.g., enterprise, metro, regional, long-haul, etc.) in any network configuration (e.g., rings—BLSR, USPR, etc., linear—1+1, 1:1, 0:1, etc., mesh, and the like). The optical network includes terminals and OADM sites (either fixed OADMs or ROADMs) and intermediate amplifiers and regenerators. As described herein, the present invention includes at least one node setup as an intermediate ROADM node with a dispersion compensation ladder, i.e. a plurality of differing DCM modules or the like connected between the ROADM inputs and outputs thereby enabling the ROADM to switch any wavelength through any one of the plurality of differing DCM modules as required.

Once configured, a wavelength (i.e., optical channel) is added to the optical network such that the wavelength traverses one or more of these intermediate ROADMs with the dispersion compensation ladder (step 94). Also, the wavelength can be reconfigured or dynamically switched. The technique 90 contemplates operation with any new or reconfigured wavelength that traverses one of the intermediate ROADM sites with the dispersion compensation ladder. The amount of dispersion compensation and dispersion slope compensation is determined for the wavelength based on the path of the wavelength in the optical network (step 96). Here, calculations or measurements are performed to determine which of the plurality of DCMs in the dispersion compensation ladder is appropriate based on an ingress point and egress point of the wavelength. This step can be computed through a NMS, EMS, network planning tool, or the like or this step can be based on a manual input from a network operator. Alternatively, this step can be based on measurements at the receiver associated with the wavelength. Once determined, the intermediate ROADM nodes are configured to route the wavelength to the appropriate DCM in the dispersion compensation ladder (step 98).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A dispersion compensation node, comprising:
   a reconfigurable input device comprising one of a wavelength selective switch and a de-multiplexer that is not a wavelength selective switch;
   a reconfigurable output device comprising one of a wavelength selective switch when the reconfigurable input device is a de-multiplexer and a multiplexer that is not a wavelength selective switch when the reconfigurable input device is a wavelength selective switch;
   a plurality of dispersion compensation elements each disposed between and connected to the reconfigurable input device and the reconfigurable output device, wherein the plurality of dispersion compensation elements comprise different dispersion compensation values, wherein the plurality of dispersion compensation elements are connected to otherwise unused ports for local add/drop of the reconfigurable input device and the reconfigurable output device, and wherein the number of dispersion compensation elements is based on the number of unused ports for local add/drop;
   wherein a wavelength is routed to one of the plurality of dispersion compensation elements by the reconfigurable input device and the reconfigurable output device responsive to an amount of compensation required for the wavelength and network ingress and egress points of the wavelength relative to the dispersion compensation node comprising the plurality of dispersion compensation elements, and wherein a minimum attainable step size of compensation obtainable by the plurality of dispersion compensation elements is based on the number of unused ports for local add/drop; and
   a computer configured to execute a planning tool to determine the different dispersion compensation values responsive to fiber types and wavelength routing.

2. The dispersion compensation node of claim 1, wherein the reconfigurable input device and the reconfigurable output device are configured to dynamically adjust the compensation required, by changing a particular dispersion compensation element, using feedback from one of a tunable dispersion compensator and either a bit-error rate (BER) or Q measurement at a receiver where the wavelength is terminated.

3. The dispersion compensation node of claim 1, wherein the reconfigurable input device comprises a de-multiplexer configured to receive an input comprising one or more wavelengths and to split copies of the one or more wavelengths to the plurality of dispersion compensation elements; and
   wherein the reconfigurable output device comprises a wavelength selective switch configured to receive inputs of the one or more wavelengths from each of the plurality of dispersion compensation elements and to selectively couple the one or more wavelengths to an output.

4. The dispersion compensation node of claim 1, wherein the reconfigurable input device comprises a wavelength selective switch configured to receive an input comprising one or more wavelengths and to selectively couple each of the one or more wavelengths to the plurality of dispersion compensation elements; and
   wherein the reconfigurable output device comprises a multiplexer configured to receive inputs from each of the plurality of dispersion compensation elements and to couple the inputs to an output.

5. The dispersion compensation node of claim 1, wherein the plurality of dispersion compensation elements comprise a dispersion compensation ladder such that each of the different dispersion compensation values for the plurality of dispersion compensation elements are in one of uniform and non-uniform steps.

6. The dispersion compensation node of claim 5, wherein a step size for the uniform and non-uniform steps is responsive to a number of ports on the reconfigurable input device and the reconfigurable output device.

7. The dispersion compensation node of claim 1, further comprising:
   at least one wavelength that is dropped and added through the reconfigurable input device and the reconfigurable output device.

8. The dispersion compensation node of claim 1, further comprising:
   a plurality of dense wave division multiplexed wavelengths traversing the reconfigurable input device, the plurality of dispersion compensation elements, and the reconfigurable output device;
   wherein at least one of the plurality of dense wave division multiplexed wavelengths comprises a different path from at least one other of the plurality of dense wave division multiplexed wavelengths such that the at least one and the at least one other traverse different elements of the plurality of dispersion compensation elements.

9. An optical network, comprising:
   a plurality of nodes, wherein at least one of the plurality of nodes comprises a reconfigurable optical add-drop multiplexer configured with a dispersion compensation ladder comprising a plurality of dispersion compensation elements of differing values disposed between inputs and outputs of the reconfigurable optical add-drop multiplexer; and
   an algorithm configured to route wavelengths traversing the reconfigurable optical add-drop multiplexer configured with the dispersion compensation ladder to one of the plurality of dispersion compensation elements based on an amount of dispersion compensation required for each of the wavelengths and network ingress and egress points for each of the wavelengths relative to the at least one of the plurality of nodes;
   wherein the reconfigurable optical add-drop multiplexer comprises a reconfigurable input device comprising one of a wavelength selective switch and a de-multiplexer that is not a wavelength selective switch and a reconfigurable output device comprising one of a wavelength selective switch when the reconfigurable input device is a de-multiplexer and a multiplexer that is not a wavelength selective switch when the reconfigurable input device is a wavelength selective switch;
   wherein the plurality of dispersion compensation elements are connected to otherwise unused ports for local add/drop of the reconfigurable input device and the reconfigurable output device, and wherein the number of dispersion compensation elements is based on the number of unused ports for local add/drop; and wherein a minimum attainable step size of compensation obtainable by the plurality of dispersion compensation elements is based on the number of unused ports for local add/drop.

10. The optical network of claim 9, wherein the reconfigurable optical add-drop multiplexer comprises:
    a de-multiplexer configured to receive an input comprising one or more wavelengths and to split copies of the one or more wavelengths to the plurality of dispersion compensation elements; and
    a wavelength selective switch configured to receive inputs of the one or more wavelengths from each of the plurality of dispersion compensation elements and to selectively couple the one or more wavelengths to an output.

11. The optical network of claim 9, wherein the reconfigurable optical add-drop multiplexer comprises:
    a wavelength selective switch configured to receive an input comprising one or more wavelengths and to selectively couple each of the one or more wavelengths to the plurality of dispersion compensation elements; and
    a multiplexer configured to receive inputs from each of the plurality of dispersion compensation elements and to couple the inputs to an output.

12. The optical network of claim 9, wherein the dispersion compensation ladder is configured such that each of the plurality of dispersion compensation elements comprises different dispersion compensation values in one of uniform and non-uniform steps.

13. The optical network of claim 12, wherein a step size for the uniform and non-uniform steps is responsive to a number of ports on reconfigurable optical add-drop multiplexer.

14. The optical network of claim 9, further comprising:
    at least one wavelength that is dropped and added at the reconfigurable optical add-drop multiplexer.

15. The optical network of claim 9, further comprising:
    a computer configured to execute a planning tool to determine different dispersion compensation values for the dispersion compensation ladder responsive to fiber types and wavelength routing;
    wherein the algorithm is configured to dynamically adjust the amount of dispersion compensation required, by changing a particular dispersion compensation element, using feedback from one of a tunable dispersion compensator and either a bit-error rate (BER) or Q measurement at a receiver where the wavelength is terminated.

16. The optical network of claim 9, further comprising:
    a plurality of dense wave division multiplexed wavelengths traversing the reconfigurable optical add-drop multiplexer;
    wherein at least one of the plurality of dense wave division multiplexed wavelengths comprises a different path from at least one other of the plurality of dense wave division multiplexed wavelengths such that the at least one and the at least one other traverse different elements of the plurality of dispersion compensation elements.

17. A method of dispersion compensation in an optical network, comprising:
    configuring the optical network with at least one reconfigurable optical add-drop multiplexer node comprising a dispersion compensation ladder comprising a plurality of dispersion compensation elements of differing values disposed between inputs and outputs of the reconfigurable optical add-drop multiplexer;
    adding a wavelength that traverses the at least one reconfigurable optical add-drop multiplexer node;
    determining dispersion compensation required for the wavelength responsive to a path of the wavelength in the optical network with regard to ingress and egress points relative to the at least one reconfigurable optical add-drop multiplexer node; and
    configuring the at least one reconfigurable optical add-drop multiplexer node to route the wavelength to one of the plurality of dispersion compensation elements responsive to the dispersion compensation required;
    wherein the reconfigurable optical add-drop multiplexer node comprises a reconfigurable input device comprising one of a wavelength selective switch and a de-multiplexer that is not a wavelength selective switch and a reconfigurable output device comprising one of a wavelength selective switch when the reconfigurable input device is a de-multiplexer and a multiplexer that is not a wavelength selective switch when the reconfigurable input device is a wavelength selective switch;
    wherein the plurality of dispersion compensation elements are connected to otherwise unused ports for local add/drop of the reconfigurable input device and the reconfigurable output device, and wherein the number of dispersion compensation elements is based on the number of unused ports for local add/drop; and
    wherein a minimum attainable step size of compensation obtainable by the plurality of dispersion compensation elements is based on the number of unused ports for local add/drop.

18. The method of claim 17, further comprising:
    adding a second wavelength that traverses the at least one reconfigurable optical add-drop multiplexer node, wherein the second wavelength comprises a different path from the path of the wavelength;
    determining dispersion compensation required for the second wavelength responsive to the different path of the second wavelength in the optical network; and
    configuring the at least one reconfigurable optical add-drop multiplexer node to route the second wavelength to one of the plurality of dispersion compensation elements responsive to the dispersion compensation required.

19. The method of claim 17, further comprising:
    reconfiguring a second wavelength in the optical network such that the second wavelength traverses the at least one reconfigurable optical add-drop multiplexer node;
    determining dispersion compensation required for the second wavelength responsive to a path of the second wavelength in the optical network; and
    configuring the at least one reconfigurable optical add-drop multiplexer node to route the second wavelength to one of the plurality of dispersion compensation elements responsive to the dispersion compensation required.

* * * * *